3,470,121
NOVEL POLYOL COMPOSITIONS AND FILLED POLYURETHANES PREPARED THEREFROM
David S. Cobbledick, Amherst, N.Y., assignor to Allied Chemical Corporation, New York, N.Y., a corporation of New York
No Drawing. Filed Sept. 15, 1966, Ser. No. 579,516
Int. Cl. C08g 22/14
U.S. Cl. 260—18                              14 Claims

ABSTRACT OF THE DISCLOSURE

Production of storage stable liquid polyol compositions comprising a mixture of an organic polyol, an inert filler dispersed therein, a divalent lead salt of a neoacid and a stabilizing amount of a basic compound of a metal of Group II A of the Periodic Table and use thereof in preparation of filled non-cellular polyurethane composition by reaction with an organic isocyanate. The urethane system is useful in preparation of pipe joints cast in situ.

---

The present invention relates to novel polyol and polyurethane compositions. More particularly it relates to novel polyol compositions containing a filler and to new polyurethanes prepared therefrom. It is especially concerned with such polyol compositions which contain a dissolved storage stable divalent lead salt catalyst and with the novel polyurethanes prepared therefrom.

It is known to gel and cure liquid mixtures of organic polyisocyanates and polyols in the presence of dissolved divalent lead catalysts such as lead naphthenate and lead octoate. The reaction occurs under ambient conditions of temperautre (ca. 25–40° C.) and pressure to afford substantially completely reacted stable polyurethanes such as filled polyurethane elastomers, particularly polyurethane elastomeric sealants. The latter compositions can be produced in situ on plastics, ceramics and the like without application of elevated temperatures and pressures.

The divalent lead catalysts lose catalytic activity when stored for short periods, e.g. for three days or more, especially at elevated temperatures, e.g. above about 50° C., in the presence of fillers, such as aluminum silicate, and the polyol. Consequently the stored polyol reactant containing filler and dissolved divalent lead catalyst on admixture with polyisocyanate produces a liquid mixture having an undesirably long gelation time (pot life).

It is the principal object of this invention to devise novel storage-stable liquid polyol-filler compositions containing a dissolved lead salt catalyst.

It is another object of the invention to prepare novel filler dispersed therein, a dissolved urethane formation under at least ambient conditions of temperature and pressure.

These and other objects and advantages will be apparent from the following description of my invention.

I have discovered that aforementioned disadvantages of prior art polyol-filler-divalent lead salt compositions are overcome with the novel storage-stable liquid polyol compositions adapted for admixture with organic polyisocyanate under substantially ambient conditions of temperautre and pressure to produce filled polyurethanes. These novel polyol compositions comprise a polyol, a filler dispersed therein, a dissolved urethane formation catalyst consisting of a divalent lead salt of a "neoacid" (i.e. a carboxylic acid having a carbon atom attached to a carboxylic acid group and bound by a single covalent bond to each of four carbon atoms) and a stabilizing amount of a member of the group consisting of the oxides, hydroxides, and basic salts of metals of Group II–A of the Periodic Table.

The invention also includes useful new filled polyurethanes prepared from said novel polyol compositions.

A preferred embodiment of my invention is directed to novel polyol-filler-catalyst compositions suitable for preparation of filled elastomers particularly of elastomeric polyurethane sealants for ceramic, e.g. in situ produced clay sewage pipe seals.

It was surprising to find according to the invention that the aforementioned Group II–A metal additives stabilize divalent lead neoacid salts on storage in organic polyol-filler compositions in as much as these metal additives have relatively little effect under similar storage conditions on the stability of plumbous salts of carboxylic acids not having the neoacid structure defined above, and also inasmuch as oxides, hydroxides, and basic salts of metals other than those of Group II–A, e.g. silver oxide, do not stabilize divalent lead neoacid salts on storage in the polyol-filler reactant as will be illustrated herein below.

The novel polyol-filler compositions of the present invention are prepared by efficient agitation, e.g. for about ten minutes, of an organic polyol or mixture of organic polyols, the filler, the divalent lead neoacid salt catalyst and the Group II–A metal additive to obtain a dispersion of the filler and the additive in the polyol-catalyst mixture. The novel organic polyol compositions thus obtained are converted to the novel filled polyurethanes of the invention on admixture, advantageously with agitation, with an organic polyisocyanate at ambient conditions of temperature and pressure employing conventional reaction techniques, although satisfactory results have been achieved at temperatures up to about 160° F. If convenient, the polyurethane formation can be carried out in a non-hydroxylic solvent such as dioxane, toluene, aliphatic petroleum hydrocarbons or the like.

The divalent lead neoacid salts contemplated by the invention include both neutral and basic plumbous salts of unsubstituted carboxylic acids containing a carboxylic acid group attached to a tertiary carbon atom, i.e. carboxylic acids having a carbon atom attached to a carboxylic acid group and bound by a single covalent bond to each of four carbon atoms. The aforementioned basic plumbous salts are prepared in a conventional manner, for example by reaction of plumbous oxide with less than the amount of neoacid required to form the neutral salt. In general the plumbous neoacid salt catalysts of the invention have excellent solubility in the urethane forming reaction mass and in the organic polyol reaction component. Representative examples of suitable divalent lead neoacid salt catalysts include:

plumbous pivalate
plumbous basic pivalate
plumbous 1-ethyl cyclopentylcarboxylate
plumbous basic 1-methyl cyclohexyl carboxylate
plumbous dimethyl malonate
plumbous α, ethyl α-methyl phenylacetic acid
plumbous basic α, α-dimethyl cyclohexaneacetic acid
plumbous 2,2-dimethyl-valerate
plumbous basic 2,2-dimethyl-valerate
plumbous 2,2-dimethyl-octanoate
plumbous basic 2,2-dimethyl-octanoate
plumbous 2,2-dimethyl undecanoate
plumbous basic 2,2-dimethyl-undecanoate
plumbous 2,2-diethyl-butyrate
plumbous basic 2,2-diethyl-butyrate
plumbous 2,2 3,3 tetramethyl-butyrate Mixtures of these and equivalent divalent lead neoacid salts can also be used.

Preferably I employ as catalyst a basic divalent lead salt of a neoacid which contains no more than 20 carbon atoms. Preferably also the catalyst employed is a basic lead salt of an alihatic neoacid, i.e. of neoacid devoid of aromatic radicals. An especially good result is obtained employing a basic plumbous salt of a monocarboxylic aliphatic neoacid as the urethane catalyst. If convenient, the lead catalyst may be charged in the form of a solution in a petroleum hydrocarbon, e.g. mineral spirits.

The amount of divalent lead catalyst employed in preparing the novel polyol and polyurethane compositions of the invention is not critical and can vary over a considerable range. Amounts of plumbous neoacid salt corresponding to about 0.01 percent lead based on the weight of the organic polyol substantially accelerate the polyol-polyisocyanate reaction. Amounts of catalyst corresponding to about 2 or more percent lead based on the weight of the polyol can be employed. Preferably an amount of lead catalyst corresponding to about 0.1–1% lead based on the weight of polyol is charged.

In accordance with the invention, any oxide, hydroxide or basic salt of a metal of Group II–A of the Periodic Table can be employed as catalyst stabilizer. Representative examples of typical stabilizer compounds include:

| | |
|---|---|
| beryllium oxide | calcium hydroxide |
| basic magnesium tetrasilicate | barium oxide |
| magnesium carbonate | barium hydroxide |
| magnesium oxide | strontium oxide |
| magnesium hydroxide | strontium hydroxide |
| calcium oxide | |

Mixtures of these and equivalent Group II–A metal compounds can also be employed.

Preferably a hydroxide and especially an oxide of a Group II–A metal is used. Preferably also a magnesium or calcium compound is employed to stabilize the catalyst.

The amount of stabilizer compound charged can vary over a wide range. Use of as little as about 0.01 percent of stabilizer compound based on the weight of the polyol, in general, effectively stabilizes the divalent lead neoacid salt on storage in the polyol-filler component. Use of about 10 percent or more of the stabilizer compound, while effective, is generally uneconomical. Preferably I employ about 0.05–5 percent and especially about 0.2–1 percent of stabilizer compound based on the weight of the polyol.

The amount and nature of the polyol, the organic polyisocyanate and the filler to be employed in preparing the novel compositions of the invention can be varied over a wide range.

Suitable polyols for preparing the novel polyol compositions and filled non-cellular polyurethanes of the invention include simple polyols such as ethylene glycol or glycerol as well as polymeric polyols such as polyester polyols and polyalkylene ether polyols. Preferably the polyol is a polyalkylene ether polyol having a molecular weight between about 130 and 4500. Such polyols correspond essentially to the formula:

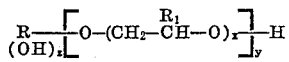

where R is the residue of a polyol as exemplified below, $R_1$ is hydrogen or methyl, $x$ is an integer from 1 to about 70, $y$ is an integer 1 to 6 and $z$ is an integer 0 to 5.

Such polyether polyols can be obtained in known manner by condensation of an alkylene oxide such as ethylene oxide, 1,2-propylene oxide, 1,3 propylene oxide or mixtures thereof with polyhydric alcohols such as ethylene glycol, propylene glycol, glycerol, trimethylol propane, 1,2,6-hexanetriol, pentaerythritol, α-methyl glucoside, sucrose or mixtures thereof in the presence of catalyst, such as trialkylamines, e.g. trimethylamine or inorganic bases, e.g. potassium hydroxide, or a metal halide, e.g. borontrifluoride. Polyether polyols which are derived from 1,2-propylene oxide and mixtures of diols and triols, of the type illustrated in Examples 1–4 or of diols and tetrols of the type illustrated in Examples 5–7 are especially useful.

Typical suitable organic polyisocyanates for preparing the novel filled polyurethanes of the invention include:

Aliphatic polyisocyanates—
   hexamethylene diisocyanate
   pentamethylene diisocyanate
Cycloaliphatic polyisocyanates—
   cyclohexyl-2,4-diisocyanate
   4,4′-methylene-bis(cyclohexyl isocyanate)
Aromatic polyisocyanates—
   2,4-toluene diisocyanate
   2,6-toluene diisocyanate
   4,4-methylene bis(phenylisocyanate)
   1,5-naphthalene diisocyanate
   4,4′,4″-triphenylmethane triisocyanate
   polyalkylene polyaryl polyisocyanates.

Urethane prepolymers, i.e. reaction products of an excess of a diisocyanate, such as any of those given above with a polyol such as trimethylol propane or polyalkylene ether polyols of the type mentioned above, as well as isocyanate polymers of diisocyanates can be used also in place of the polyisocyanates noted above. Preferably the organic polyisocyanate reactant is a urethane prepolymer.

The preferred urethane elastomers of the invention should contain a cross-linked structure. To produce such cross-linking, it is desirable to employ a polyol and/or polyisocyanate reactant of functionality greater than 2 and especially about 2.1 to 2.7.

The proportions of organic polyisocyanate and polyol employed in the polyurethane-forming reaction can be varied somewhat depending upon the particular characteristics of the non-cellular polyurethane product desired. In general a proportion of polyisocyanate and polyol sufficient to provide a ratio of isocyanato to hydroxyl groups of at least 0.9:1 should be used. In preparing urethane elastomers according to a preferred embodiment of the invention an amount corresponding to a ratio of NCO:OH of between about 1.0.4:1 is used.

In preparing filled elastomers according to a particular embodiment of the invention, the filler charged to the urethane-forming reaction mixture is a conventional finely divided material desiganted in this art as "inert." In preparing filled elastomers useful as sealants for sewer pipes and the like it is desirable that the fillers used be resistant to sewage and soil micro-organisms.

Typical examples of suitable fillers include:

| | |
|---|---|
| attapulgite | magnesium trisilicate |
| kaolin | zinc sulfide |
| talc | barium sulfate |
| bentonite | calcium fluoride |
| halloysite | titanium dioxide |
| aluminum silicate | amorphorus silica |
| calcium silicate | |

Mixtures of these and other conventional fillers can be used also.

These fillers may and usually do contain moisture, e.g. water of crystallization in amounts of about 10–15 weight percent and adsorbed moisture in amounts of about 1 percent based on the weight of the filler. Fillers devoid of water of crystallization which can be obtained by calcining hydrated fillers can be used in the present novel compositions. However, uncalcined fillers are advantageously employed since they generally provide sealant compositions of improved resistance to acids.

The amount of filler used is not critical and can be varied over a broad range. The amount used will depend to a considerable extent upon the particular properties and characteristics desired in the final polyurethane product. Generally the filler is added in amounts of between about 25 and 150% by weight of the polyol component, corresponding to between about 10% and about 60% by weight of the total reaction mixture.

The present invention provides novel polyol-filler compositions containing divalent lead salt catalysts which can be stored for as long as three days or more even at elevated temperatures, e.g. of about 55° C. or higher without substantial loss in catalyst activity when the stored polyol is reacted with polyisocyanate under substantially ambient conditions. Divalent lead neoacid salts, stabilized in accordance with the present invention can also be used in admixture with halogen-free organomercuric salt urethane formation catalysts or with halo-organomercuric salts.

The more detailed practice of my invention will be illustrated by the following examples in which parts and percentages are by weight unless otherwise noted and temperatures are in degrees centigrade. The time measurements in the following examples are accurate to about ±0.25 minutes.

EXAMPLE 1

Part A.—Preparation of polyisocyanate (urethane prepolymer component)

Sixty-nine parts of a mixture of about 80% 2,4-toluene diisocyanate and about 20% 2,6-toluene diisocyanate is heated to 50°. Over a period of about 30 minutes 31 parts of a 1,2-propylene glycol based poly-1,2-propylene oxide polyether (hydroxyl number 380, equivalent weight 147) is charged with the toluene diisocyanate mixture with agitation, the mixture being maintained at about 70° during the addition. On completion of the addition the reaction mass is agitated at 70° for 2 hours and cooled to ambient temperature. The resultant isocyanate-terminated urethane prepolymer has the following characteristics:

Aminer equivalent _____ 171
Free NCO, percent _____ 24.5
Unreacted toluene diisocyanate, percent _____ 25.4

Part B.—Preparation of polyether-polyol-filler component and polyurethane formation A filler consisting of 1250 parts uncalcined aluminum silicate containing about 1% water (Hydrite Flat D, Georgia Kaolin Co.), 45.0 parts of a catalyst consisting of a solution of basic plumbous 2,2-dimethyl octanoate in mineral spirits containing about 24% metallic lead (Lead Ten-Chem, Mooney Chemical Co.), and 2.5 parts of finely divided magnesium oxide are charged to 1500 parts of a mixture of polyalkylene ether polyols (average equivalent weight 737; average functionality 2.3) consisting of:

49.5% of glycerol based 1,2-propylene oxide polyether having a hydroxyl number of 83 and an equivalent weight of 675.

16.5% of a glycerol based 1,2-propylene oxide polyether having a hydroxyl number of 56 and an equivalent weight of 1000.

25.5% of a 1,2-propylene glycol based 1,2-propylene oxide polyether having a hydroxyl number of 83 and an equivalent weight of 675.

8.5% of a 1,2-propylene glycol based 1,2-propylene oxide polyether having a hydroxyl number of 56.

The mixture is agitated in a high shear mixer (Cowles Dissolver, Morehouse Cowles Co.) for 10 minutes. The resulting warm (60–70°) dispersion is cooled to ambient temperature (about 25°). To 150 parts of the cooled dispersion is added 20 parts of the urethane prepolymer component described above thereby providing a mixture having an isocyanate group to hydroxyl group ratio of 1.05:1.0. This mixture is agitated for 30–60 seconds at about 25° and about 40 parts of the resulting fluid mass is allowed to stand at an ambient temperature of 38°. The liquid reaction mass solidifies to a non-fluid gel in 4.75 minutes (as measured from commencement of agitation). After standing for 10 minutes (as measured from commencement of agitation) the non-cellular-filled urethane elastomer has a Shore A hardness of 46 as measured with a Shore Durometer (Shore Instrument and Mfg. Co. Inc.).

Part C.—Polyurethane formation after storage of the polyol reactant at 55°

A 1000-part sample of the polyol-filler catalyst magnesium oxide composition of Part B is stored for two weeks at 55°. After one week of storage, a 150-part sample of the mass is cooled to ambient temperature. Twenty parts of the urethane prepolymer of Part A is charged to the polyol composition and the resulting mixture is thereafter treated in accordance with the procedure of Part B. The liquid reaction mass solidifies to a non-fluid gel in 5.5 minutes and the non-cellular urethane has a Shore A hardness of 42 after standing for 10 minutes.

After 2 weeks storage at 55°, the polyol on reaction with polyisocyanate according to the above procedure solidifies to a non-fluid gel in 5.0 minutes and has a Shore A hardness of 42 after standing 10 minutes.

EXAMPLE 2

The procedure of Example 1 is repeated substantially as described except that no magnesium oxide is charged to the polyol. The liquid mass thus formed solidifies in 6.0 minutes and after standing for 10 minutes has a Shore A hardness of 12. After standing only three days the gelation time is 12.0 minutes. This doubling of the gelation time indicates the importance of the addition of Group II-A metal derivatives in mixtures which will be stored and their ability to stabilize the catalytic activity of the lead catalysts.

EXAMPLE 3

The procedure of Example 1 is repeated substantially as described except that 45 parts of a solution of basic lead naphthenate in mineral spirits containing about 24% lead (Nuodex Corp.) is charged as catalyst. The initial gelation time in this case was 9.5 minutes and after three days' storage increased to 12.5 minutes.

Results which are substantially similar to those of this example are obtained employing a solution of lead octoate containing substantially the same amount of lead in mineral spirits as catalyst.

A similar experiment was carried out as above omitting the addition of magnesium oxide to the polyol. In this case, the initial gelation time was 9.75 minutes and this increased to 15.0 minutes after 3 days.

These examples illustrate the poorer results obtained when divalent lead salts of a carboxylic acid not having the neoacid structure are used as well as illustrating the failure of the Group II-A metal derivatives in stabilizing such plumbous salts.

EXAMPLE 4

The procedure of Example 1 is repeated substantially as described except that 7.5 parts of silver oxide is used instead of a metal oxide of Group II A. The liquid reaction mass solidifies to a non-fluid gel in 4.0 minutes and after standing for 10 minutes the urethane elastomer has a Shore A hardness of 52; however, after one week's storage, the gelation time increases to 15.5 minutes, thus showing the failure of a Group I metal oxide to stabilize a divalent lead neoacid salt catalyst.

EXAMPLE 5

The procedure of Example 1 is repeated substantially as described except that the polyol reactant is prepared from 2500 parts of the filler of Example 1, 90 parts of the catalyst of Example 1, 5 parts of calcium oxide and 2910 parts of a polyether polyol mixture (hydroxyl number 76, average equivalent weight 737, average functionality 2.55) consisting of:

55% of an α-methyl glucoside based 1,2-propylene oxide polyether.

45% of a 1,2-propylene glycol based 1,2-propylene oxide polyether.

The initial gelation time of the mixture was 6.75 minutes and after storage for one week the gelation time was 6.5 minutes with a Short A hardness of 22.

EXAMPLE 6

The procedure of Example 1 is repeated substantially as described except that the polyol reactant is prepared from 2500 parts of the filler of Example 1, 3000 parts of the mixture of organic polyols of Example 5, 5 parts of magnesium oxide, and a catalyst consisting of 30 parts of the catalyst of Example 1 and 11 parts of phenyl mercuric propionate. The liquid mass solidified to a nonfluid gel in 6.75 minutes and after standing for 10 minutes exhibited a Shore A hardness of 38. After being stored for two weeks, the gelation time was 6.5 minutes and the hardness 46. Even after storage for one month, the gelation time and hardness remained 6.5 minutes and 46 respectively.

EXAMPLE 7

The procedure of Example 6 is repeated substantially as described except that 11 parts of phenyl mercuric p-chlorobenzoate are charged instead of phenyl mercuric propionate. The initial gelation time in this case was 7.0 minutes and after standing for 10 minutes the Shore A hardness was 33. After being stored for two weeks, the gelation time was 6.5 minutes and the Shore A hardness was 50. Even after one month, the gelation time was 6.75 minutes and the Shore A hardness 40.

The foregoing Examples 6 and 7 illustrate the compatability of the catalyst-stabilizer of the present invention with organo-mercury catalysts to provide polyol-filler-catalyst compositions of excellent stability.

I claim:

1. A composition of matter adapted for admixture with an organic isocyanate to produce a filled noncellular polyurethane composition comprising at least one organic polyol, an inert filler dispersed therein, an unsubstituted divalent lead salt of a carboxylic acid having a carbon atom attached to said carboxylic acid group and bound by a single covalent bond to each of four carbon atoms as a urethane formation catalyst dissolved in the polyol, and a stabilizing amount of a member of the group consisting of oxides, hydroxides and basic salts of metals of Group II-A of the Periodic Table.

2. A composition as claimed in claim 1 wherein said urethane catalyst is a basic divalent lead salt of a monocarboxylic aliphatic neoacid.

3. A composition as claimed in claim 1 wherein said urethane catalyst is present in an amount corresponding to about 0.01% to about 2% by weight lead based on the weight of the organic polyol.

4. A composition as claimed in claim 1 wherein said urethane catalyst is plumbous 2,2-dimethyl-octanoate.

5. A composititon as claimed in claim 1 wherein said catalyst stabilizer is an oxide or a hydroxide of a metal of Group II-A.

6. A composition as claimed in claim 1 wherein the metal of said catalyst stabilizer is magnesium.

7. A composition as claimed in claim 1 wherein the metal of said catalyst stabilizer is calcium.

8. A composition as claimed in claim 1 wherein said catalyst stabilizer is present in an amount of about 0.05% to about 5% by weight of the organic polyol.

9. A process for producing a noncellular filled polyurethane composition comprising admixing an organic polyisocyanate with a composition of matter comprising an organic polyol, an inert filler dispersed therein, an unsubstituted divalent lead salt of a carboxylic acid having a carbon atom attached to said carboxylic acid group and bound by a single covalent bond to each of four carbon atoms as a urethane formation catalyst dissolved in the polyol, and stabilizing amount of a member of the group consisting of oxides, hydroxides and basic salts of metals of Group II-A of the Periodic Table.

10. A process as claimed in claim 9 wherein the proportions of the organic polyisocyanate to polyol are such as provide an NCO:OH ratio of at least 0.9:1.

11. A process as claimed in claim 9 wherein said noncellular filled polyurethane composition comprises the reaction product of an organic polyisocyanate and an organic polyol, having an inert filler dispersed therein, in the presence of plumbous 2,2-dimethyl-octanoate corresponding to 0.1 to 1% by weight lead based on the weight of the polyol and 0.2 to 1%, by weight of magnesium oxide based on the weight of the polyol.

12. A process as claimed in claim 9 wherein said catalyst stabilizer is an oxide or a hydroxide of a metal of Group II-A.

13. A process as claimed in claim 9 wherein the metal of said catalyst stabilizer is magnesium.

14. A process as claimed in claim 9 wherein the metal of said catalyst stabilizer is calcium.

References Cited

UNITED STATES PATENTS

| | | | |
|---|---|---|---|
| 3,395,108 | 7/1968 | Cobbledick et al. | 260—18 |
| 3,391,101 | 7/1968 | Kelly et al. | 260—37 |
| 3,272,098 | 9/1966 | Buchholtz et al. | 260—37 X |
| 3,201,136 | 8/1965 | Harrison et al. | 260—77.5 X |
| 3,196,026 | 7/1965 | Menard et al. | 260—37 X |
| 3,342,765 | 9/1967 | Oosterhof et al. | 260—23 |

FOREIGN PATENTS

| | | |
|---|---|---|
| 673,263 | 10/1963 | Canada. |
| 947,586 | 1/1964 | Great Britain. |
| 901,056 | 7/1962 | Great Britain. |

OTHER REFERENCES

Enjay Technical Bulletin D-27, 1963, page 1.

The Science of Surface Coatings, Chatfield; Benn Ltd.; London 1962; pages 220, 222.

DONALD E. CZAJA, Primary Examiner

C. WARREN IVY, Assistant Examiner

U.S. Cl. X.R.

252—430; 260—37, 77.5; 277—198